(12) United States Patent
Brosnan et al.

(10) Patent No.: US 12,567,050 B2
(45) Date of Patent: Mar. 3, 2026

(54) INVENTORY INTEGRITY SYSTEM

(71) Applicant: TOSHIBA GLOBAL COMMERCE SOLUTIONS, INC., Durham, NC (US)

(72) Inventors: Susan W. Brosnan, Raleigh, NC (US); Jessica Snead, Cary, NC (US); Patricia Hogan, Raleigh, NC (US); Daniel R. Goins, Wake Forest, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 361 days.

(21) Appl. No.: 18/161,962

(22) Filed: Jan. 31, 2023

(65) Prior Publication Data

US 2024/0257090 A1 Aug. 1, 2024

(51) Int. Cl.
*G06Q 20/20* (2012.01)
*G06Q 20/40* (2012.01)

(52) U.S. Cl.
CPC ......... *G06Q 20/203* (2013.01); *G06Q 20/208* (2013.01); *G06Q 20/4016* (2013.01)

(58) Field of Classification Search
CPC ............... G06Q 20/203; G06Q 20/208; G06Q 20/4016; G06Q 20/206; G06N 20/00; G07G 1/0036; G07G 1/0054; G07G 1/0063; G07G 3/00; G07G 3/003; G07G 3/006
See application file for complete search history.

(56) References Cited

U.S. PATENT DOCUMENTS 6,779,722 B1 * 8/2004 Mason .................... A47F 9/046
235/383
10,451,405 B2 10/2019 Clayton et al.

2004/0199427 A1 10/2004 van der Loo
2022/0198550 A1 * 6/2022 Meidar .................. G06Q 20/20
2022/0390285 A1 * 12/2022 Parrott .................. G01K 1/024
2023/0074732 A1 * 3/2023 Howard .............. G06V 40/172

OTHER PUBLICATIONS

P.L. Venetianer, Video Verification of Point of Sale Transactions, Sep. 7, 2007, 2007 IEEE Conference on Advanced Video and Signal Based Surveillance, pp. 411-416 (Year: 2007).*
Villanueva, J., et al., "Mapping Relationships and Positions of Objects in Images Using Mask and Bounding Box Data", (2019) SMU Data Science Review: vol. 2: No. 3, Article 11.
Rosebrock, A., "Measuring size of objects in an image with OpenCV", Mar. 28, 2016, Downloaded from the internet Jan. 20, 2023—https://www.pyimagesearch.com/2016/03/28/measuring-size-of-objects-in-an-image-withopencv/.

* cited by examiner

*Primary Examiner* — Aaron N Tutor
(74) *Attorney, Agent, or Firm* — Stanek Lemon Crouse & Meeks, PA

(57) ABSTRACT

The present disclosure utilizes image data analysis to improve the accuracy and integrity of item characteristic information in a database. During point-of-sale (POS) transactions, a security exception may be triggered when an item's stored characteristic information, such as weight or dimensions, is found to be inaccurate or missing. By capturing images of procedures performed to resolve security exceptions, the system can analyze aspects of the individual's appearance or behavior to determine if measurement procedures are performed correctly. Measures from properly performed measurement procedures can be used to selectively update the item's characteristic information in the system, improving the accuracy and integrity the characteristic information.

17 Claims, 4 Drawing Sheets

400

402 — DETECT A SECURITY EXCEPTION FOR AN ITEM PART OF A POINT-OF-SALE TRANSACTION

404 — RECEIVE IMAGE DATA OF A PROCEDURE TO RESOLVE THE SECURITY EXCEPTION

406 — PROCESS THE IMAGE DATA TO ANALYZE ASPECTS OF THE PROCEDURE TO DETERMINE WHETHER THE PROCEDURE WAS PROPERLY PERFORMED

408 — SELECTIVELY UPDATE CHARACTERISTIC INFORMATION FOR THE ITEM

INVENTORY INTEGRITY SYSTEM

BACKGROUND

Some retailers implement inventory control measures to reduce the possibility of mistakes or fraudulent activity during point-of-sale (POS) transactions. For example, during a POS transaction, a POS system may measure the weight of an item and compare the recorded weight to an expected weight to confirm that the scanned item is the same item that was placed in the bagging area. As new inventory is added, or as items get new packaging, some of the expected item characteristics may become inaccurate or unreliable, which can compromise the efficiency and reliability of the inventory control measures.

Figure 1:
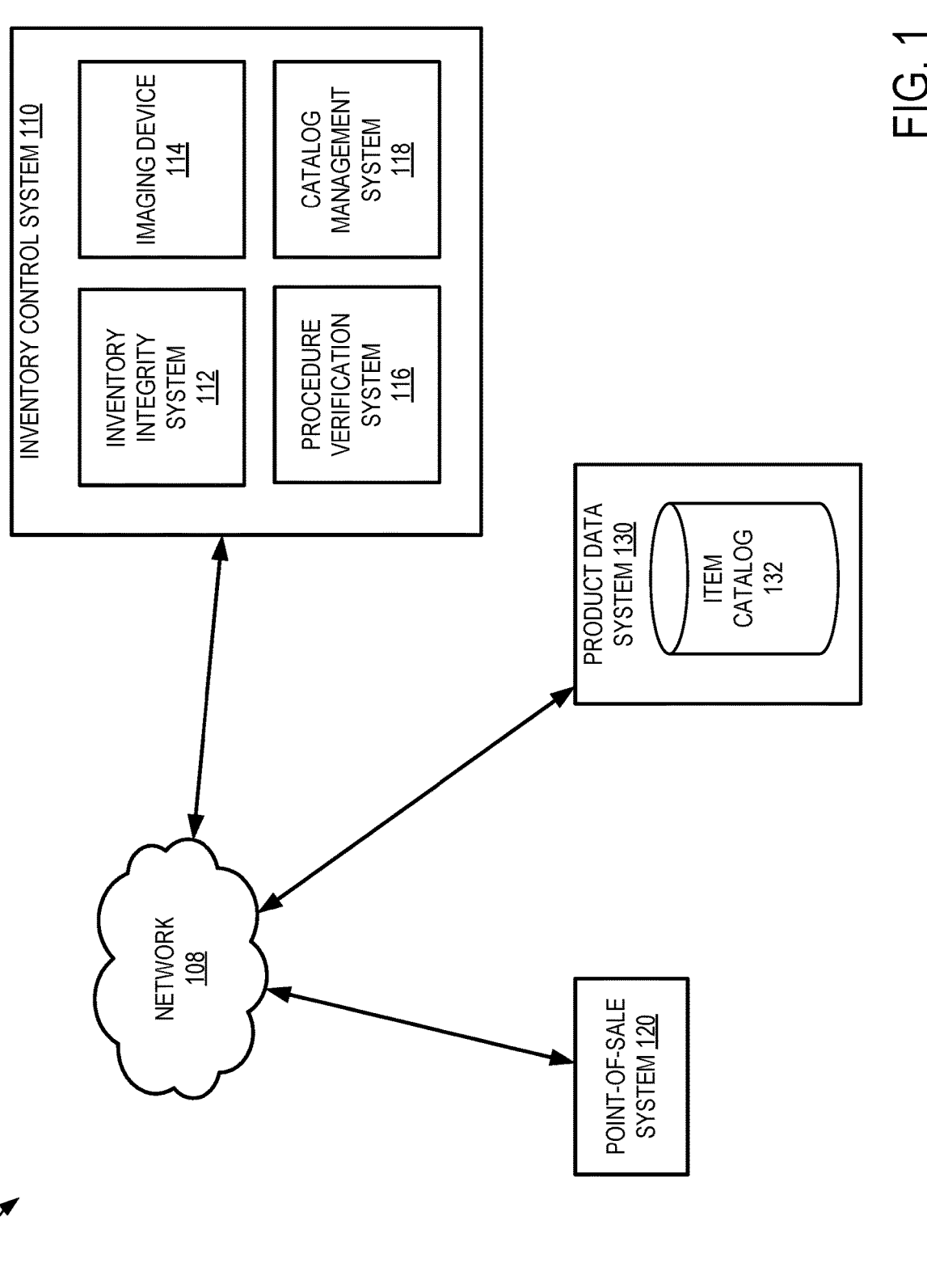
FIG. 1 illustrates an embodiment of a retail environment.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

In the present disclosure, reference is made to a "Point-Of-Sale (POS) system." As used herein, the term "POS system" refers to any system that is used to process transactions at a retail store or other business, including self-checkout (SCO) systems where individuals can scan, pay for, or bag their own items. POS systems are used for a variety of purposes, such as completing sales transactions, processing returns, or handling inquiries. POS systems can be found in a variety of settings, including traditional brick-and-mortar retail stores, online stores, and mobile sales environments.

In a retail or other setting, inventory control measures can help to reduce mistakes or fraudulent activity during POS transactions by verifying that the items scanned at a POS system match the items placed in the bagging area. For example, the POS system may use tools such as scales or dimension analyzers to obtain measurements of the items and compare those measurements to expected values. If the measurements do not match expectations, the system may output a security exception.

In the event of a security exception, it is often the responsibility of an individual (e.g., a shopper assistant associate) to resolve the issue before the POS transaction can be completed. In most cases, the individual can resolve the exception by pressing a button on the screen, indicating that she has manually verified the identity of the scanned item and determined that it matches the item placed in the bagging area. However, in cases where the exception is caused by incorrect or incomplete data for the item, such as when the item is new to inventory or has new packaging and the database is not up to date, the individual may be prompted to perform a measurement procedure to resolve the exception. Performing a measurement procedure allows the system to obtain updated measurements for the item, which can be used to update the database. A measurement procedure can help to maintain the accuracy and integrity of the database. However, performing a measurement procedure can be tedious or inconvenient for individuals, leading them to sometimes skip the measurement procedure and simply mark it as completed. In some such cases, the individual may simply indicate that the measurement procedure was performed, which might cause the system to save the data as if the measurement procedure had been correctly performed. This can result in incorrect data being saved, as the actual measurement procedure was not performed.

To address these or other issues, the present disclosure improves inventory control measures by utilizing a trained neural network, which is trained to recognize actions or procedures, such as those generally performed by an individual during a measurement procedure. The trained neural network analyzes images of the alleged performance of the measurement procedure to determine whether the measurement procedure was performed and/or whether it was performed correctly. When the output of the neural network indicates that the measurement procedure was likely carried out correctly, the obtained characteristic information can be considered reliable and can be saved for later integration into the database (e.g., if other instances have similar results). When the output of the neural network indicates that the measurement procedure was likely not carried out or was likely carried out incorrectly, the system can be instructed to disregard obtained characteristic information. In this way, the system allows for more accurate and reliable data to be saved in the database, which can help to improve the efficiency and effectiveness of inventory control measures and reduce mistakes or fraudulent activity during POS transactions.

The present disclosure significantly improves the robustness of POS systems. For example, the implementation of a trained neural network to recognize actions or procedures performed by individuals allows the system to accurately determine whether the measurement procedure was carried out correctly or not. The neural network is able to analyze images of the alleged performance of the measurement procedure and provide reliable output, which helps to improve the overall accuracy and integrity of the database. The concepts of the present disclosure can be performed concurrently or successively on tens, hundreds, or thousands of POS systems. For example, the trained neural network can be deployed on multiple POS systems at different locations, allowing the system to accurately analyze measurement procedures and obtain updated characteristics using multiple systems at the same time.

FIG. 1 illustrates an embodiment of an environment 100 that includes a network 108, an inventory control system 110, a POS system 120, and a product data system 130. To simplify discussion and not to limit the present disclosure, FIG. 1 illustrates only one POS system 120, though multiple may be used, located at the same or different locations. Though the present disclosure generally refers to a retail environment, but it will be appreciated that the environment 100 is not limited to retail locations. Rather, the environment 100 can include other types of environments as well, such as office buildings, hospitals, transportation hubs, and so on.

Any of the foregoing components or systems of the environment 100 may communicate via the network 108. Although only one network 108 is illustrated, multiple distinct and/or distributed networks may exist. The network 108 can include any type of communication network. For example, the network 108 can include one or more of a wide area network (WAN), a local area network (LAN), a cellular network (e.g., LTE, HSPA, 3G, and other cellular technologies), an ad hoc network, a satellite network, a wired network, a wireless network, and so forth. In some embodiments, the network 108 can include the Internet.

The various components and systems of the environment 100 may be implemented on or include a variety of computing devices, such as processors, distributed processing systems, servers, or isolated execution environments (IEEs) like virtual machines or containers. Any of the foregoing components or systems of the environment 100 may be combined and/or may include software, firmware, hardware, or any combination(s) of software, firmware, or hardware suitable for the purposes described.

The inventory control system 110 may be responsible for ensuring the accuracy and integrity of the item catalog 132. This responsibility can include tasks such as identifying when there is incorrect or incomplete data for an item during a POS transaction, monitoring and analyzing a procedure for obtaining new or updated measurements, and submitting updates to the item catalog 132 if the measurement procedure is determined to be correctly performed. The inventory control system 110 can include an inventory integrity system 112, an imaging device 114, a procedure verification system 116, and a catalog management system 118.

The imaging device 114 can capture image data of items or individuals present in the environment 100. For example, the imaging device 114 can capture image data associated with a measurement procedure performed by an individual to resolve a security exception. As described herein, a measurement procedure can be a process that is used to obtain updated characteristic information for an item when the data in the item catalog 132 is incorrect or incomplete. This procedure can involve using tools such as scales or dimension analyzers to obtain characteristic information of the item. The image data captured during this process can include a variety of information that can be used to determine if the measurement procedure was performed correctly and if the obtained characteristic information can be considered reliable.

The image data can include images of an individual holding the item, placing the item on the scale or dimension analyzer, or reading the measurements. The image data can be used to ensure that the individual is following the proper protocol for the measurement procedure and that the item is being handled correctly. The image data can include images of the item itself, including any packaging or labeling. This can be used to confirm that the item being measured is the correct item and that it matches the data of the item that was scanned. Additionally, the image data can include images of the tools and equipment used during the measurement procedure, such as the scale or dimension analyzer. This can be used to ensure that the equipment is functioning properly and that the measurements being obtained are accurate. The image data can be used to monitor and analyze the behavior of individuals. For example, the image data can include images of facial features, body posture, movement patterns, or the proximity of an individual to a POS system, among other things. In this way, the image data can provide valuable information that can be used to determine whether the measurement procedure is being performed correctly and whether the obtained characteristic information is accurate and reliable.

The imaging device(s) 114 can be positioned in various locations throughout the environment 100 to capture image data of individuals, items, or the measurement procedure. For example, the imaging device 114 can be placed proximate to the POS system 120, where they can capture images of individuals interacting with the systems and the measurement procedure being performed by individuals. This can provide valuable information about the individuals' behavior and the correctness of the measurement procedure. In addition or alternatively, the imaging device 114 can be placed throughout the environment 100, such as at an entrance, exits, throughout the aisles, etc., in order to capture images of individuals' movement patterns, body posture, or proximity to different areas of the environment 100. This way, the imaging device 114 can capture a wide range of information and provide a comprehensive view of the environment 100, allowing for accurate and effective monitoring and analysis of individuals and the measurement procedure.

The inventory integrity system 112 is responsible for identifying and issuing security exceptions during POS transactions. These security exceptions may occur when the measurements of scanned items do not match their expected values as stored in the item catalog 132. The causes of these security exceptions can vary, including discrepancies between the measurements of scanned items and their expected values, or by incomplete or inaccurate characteristic information associated with an item. For example, when an item is new to inventory or has undergone changes such as new packaging, the item catalog 132 may not yet reflect these updates, causing a mismatch between the expected measurements, such as weight or dimensions, and the actual measurements the POS system 120 during a POS transaction. To resolve this exception, the inventory control system 110 prompts an individual, such as a store associate, to perform a measurement procedure to update the item catalog 132 with the correct characteristics. This helps to ensure the accuracy and integrity of the item catalog 132 and reduce mistakes or fraudulent activity during POS transactions.

The procedure verification system 116 can analyze images captured by an imaging device 114 to determine if a measurement procedure was performed correctly. The procedure verification system 116 can analyze the images to recognize actions and movements typically performed during a measurement procedure, such as an individual interacting with a POS system 120, holding or moving an item, placing the item on a scale or dimension analyzer, reading measurements, or making adjustments. The procedure verification system 116 can also evaluates images of the item, tools, equipment, packaging, or labeling to ensure accuracy and detect mistakes or fraudulent activity during POS transactions.

In some cases, the procedure verification system 116 uses a trained neural network to analyze images captured by an imaging device 114. The neural network can recognize actions or procedures typically performed by an individual, such as those performed using scales or dimension analyzers. The neural network can evaluate various elements of the images, including but not limited to, the individual interacting with the POS system 120, the actions and movements of the individual, the item itself, its packaging and labeling, the tools and equipment used during the measurement procedure. The neural network can evaluate the images of the tools and equipment used, to ensure that they are functioning properly and that the measurements being obtained are accurate. If the neural network detects that the measurement procedure was performed correctly, the obtained characteristic information can be considered reliable and saved for later integration into the item catalog 132. This helps to maintain the accuracy and integrity of the database and can reduce mistakes or fraudulent activity during POS transactions.

As an example, when analyzing images of an individual interacting with an item, the neural network can evaluate whether the individual properly moved the item from a scanning or bagging area to a designated area for the measurement procedure to be performed. This can be done by analyzing the position of the item in relation to the individual's body and surrounding environment, and comparing it to known positions associated with performing a measurement procedure. As described herein, the neural network can be trained using a dataset of images of individuals moving items correctly from to the designated area for the measurement procedure. The neural network can also make a determination by analyzing the actions and movements of the individual, such as their posture, facial expression, and hand gestures. If the neural network determines that the individual did not properly move the item or did not follow the proper protocol, it can flag the image for further investigation or determine that the measurement procedure was not properly performed. Additionally, the neural network can also analyze the environment in which the measurement procedure is being performed, such as the lighting conditions, the presence of any obstructions or obstacles, and the location of other individuals or equipment in the area. This can help to ensure that the measurements obtained are accurate and reliable, as the neural network can take into account any potential sources of error or bias.

As another example, when analyzing images of an item itself, the neural network can make a determination about whether the item being measured in the measurement procedure is the correct item. Specifically, the neural network can determine if the item being measured is the one that was scanned and threw a security exception. This can be accomplished by analyzing the packaging or labeling of the item and comparing it to the known, correct packaging or labeling for that item, or by tracking the item since it was scanned and following it through the measurement procedure. As described herein, the neural network can be been trained using a dataset of images of items with correct packaging or labeling that match the data in the item catalog 132. If the neural network determines that the item being measured is the item that was scanned, it can consider the item as correct and determine that the measurement procedure was performed correctly. Alternatively, if the neural network determines that the item being measured is not the correct item, it can flag the image for further investigation or determine that the measurement procedure was not performed correctly.

As another example, the neural network can determine whether the equipment used during the measurement procedure is functioning correctly. For instance, when analyzing an image of a scale, the neural network can determine whether the scale is properly calibrated and providing accurate measurements by comparing the position of the scale, and the readings displayed on the scale with the expected position and readings of a calibrated scale. If the neural network determines that the scale is not properly calibrated or that the measurements being obtained are inaccurate, it can determine that the measurement procedure was not performed correctly. Similarly, when analyzing an image of a dimension analyzer, the neural network can determine the proper functioning of the equipment by comparing the position of the dimension analyzer and the readings displayed on the dimension analyzer with the expected position and readings of a proper functioning dimension analyzer. If the neural network determines that the dimension analyzer is not properly functioning or that the measurements being obtained are inaccurate, it can determine that the measurement procedure was not performed correctly.

As another example, the neural network can determine the accuracy of the measurements obtained during the measurement procedure. As described herein, the neural network can be trained on a dataset of accurate measurements and can identify any discrepancies between the measurements obtained during the measurement procedure and the expected measurements. For instance, if the neural network determines that the measurement obtained is an outlier value, such as a weight of 0 for a physical item, it can flag the image for further investigation, indicating that the measurement procedure was not performed correctly. Another example, the neural network can determine the accuracy of the measurements obtained by comparing the dimension measurements obtained to the expected dimensions of the item being measured. If the neural network determines that the measurement obtained is an outlier value, such as a dimension of 0 for a physical item, it can flag the image for further investigation, indicating that the measurement procedure was not performed correctly. It will be appreciated that, in some cases, a dimension of 0 may not be incorrect for some items. For example, some item (e.g. a greeting card) may effectively have a 0-width dimension. In some such cases, the neural network can determine not to consider such a measurement as an outlier. By considering some or all of these factors, the neural network can make a highly accurate and reliable determination of whether the measurement procedure was performed correctly.

The catalog management system 118 is responsible for managing, creating, or updating the data in the environment 100. For example, the catalog management system 118 can maintain the item catalog 132, which can be a database of characteristic information about items. The catalog management system 118 populates and updates the item catalog 132 with characteristic information that it receives and/or generates as part of measurement procedures. As characteristic information changes, the catalog management system 118 can update the item catalog 132 to ensure it retains an up-to-date database of information. In some cases, the measures received from properly performed measurement procedures are not automatically populated into the item catalog 132. Instead, data from multiple POS systems may be aggregated or analyzed to determine which, if any, information to update or add. For example, if multiple POS systems receive the same measurements, the catalog management system 118 can determine to update the item catalog 132 with the most recent, accurate data. This process can help to ensure that the item catalog 132 remains up-to-date and accurate, which can help to improve the efficiency and effectiveness of inventory control measures and reduce mistakes or fraudulent activity during POS transactions.

The POS system 120 facilitates POS transactions. The POS system 120 may include or be in communication with hardware and software components, such as scanners, printers, databases, scales, dimension analyzers, etc. to support the POS transaction. The POS system 120 may include a user interface, such as a touch screen or keyboard, to allow individuals to interact with the POS system 120 during the POS transaction. As described herein, an individual can interact with the POS system to perform a measurement procedure.

The product data system 130 can include an item catalog 132. The item catalog 132 can store characteristic or other information such as item descriptions, measurements, dimensions, or other details. The item catalog 132 can be implemented as cloud storage, such as Amazon Simple Storage Service (S3), Elastic Block Storage (EBS) or Cloud-Watch, Google Cloud Storage, Microsoft Azure Storage, InfluxDB, etc. The item catalog 132 can include one or more data stores storing data that has been received from the catalog management system 118, the inventory control system 110, or data that has been received directly into the item catalog 132. The item catalog 132 can be configured to provide high availability, highly resilient, low loss data storage. The item catalog 132 can include Amazon Cloud-Watch metrics. In some cases, to provide the high availability, highly resilient, low loss data storage, the item catalog 132 can store multiple copies of the data in the same and different geographic locations and across different types of data stores (for example, solid state, hard drive, tape, etc.). Further, as data is received at the item catalog 132 it can be automatically replicated multiple times according to a replication factor to different data stores across the same and/or different geographic locations.

Figure 2:
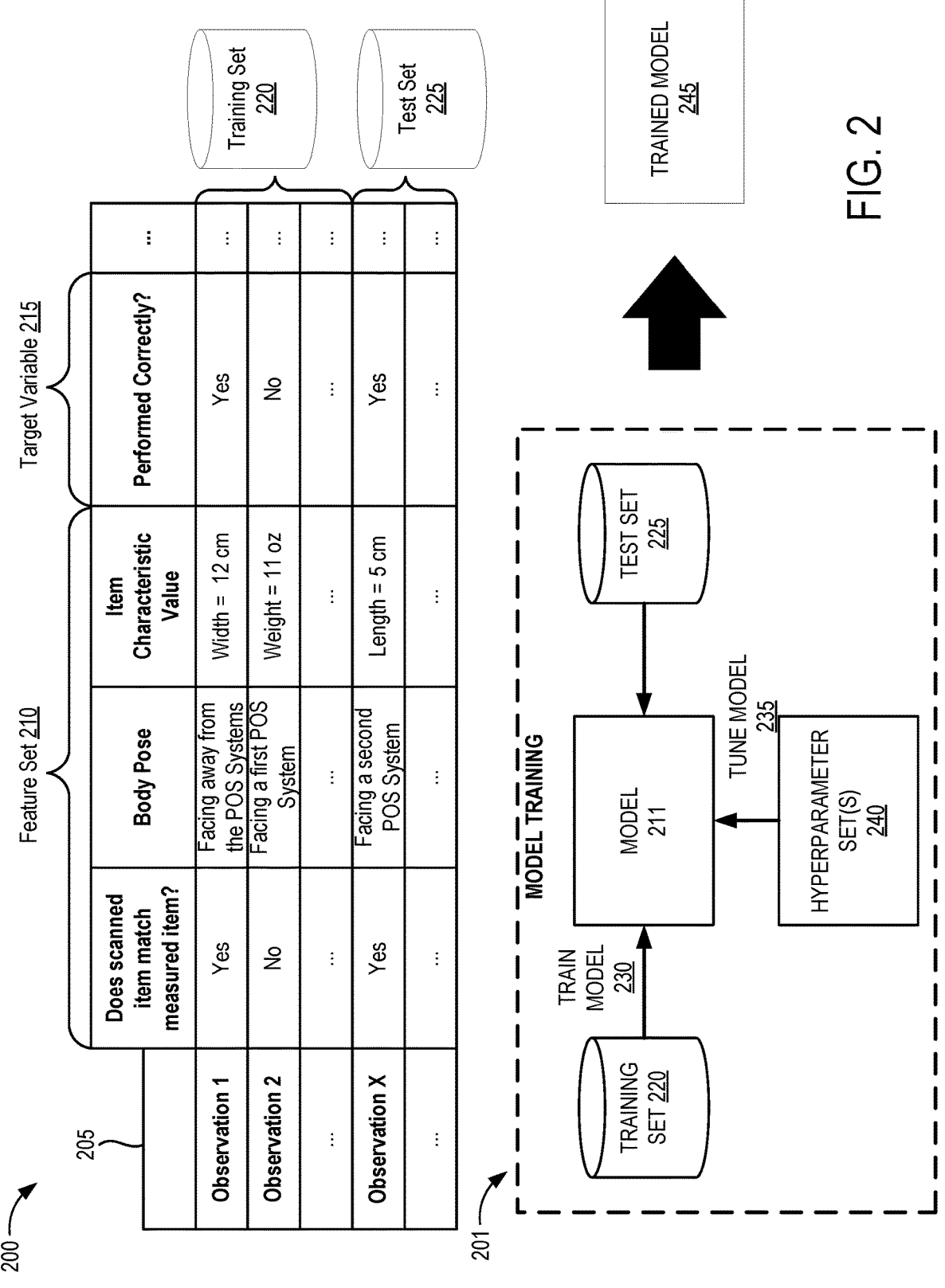
FIG. 2 is a diagram illustrating an example of training a machine learning model in connection with the present disclosure.

FIG. 2 is a diagram 200 illustrating an example of training a machine learning model 211 in connection with the present disclosure. The training of the machine learning model 211 described herein may be performed using a machine learning system 201. The machine learning system 201 may include or may be included in a computing device, a server, a cloud computing environment, or the like, such as the procedure verification system 116 of FIG. 1.

As shown by reference number 205, a machine learning model 211 may be trained using a set of observations. The set of observations may be obtained and/or input from historical data, such as data gathered during one or more processes described herein. For example, the set of observations may include data gathered from the procedure verification system 116, the POS system 120, or another system of the environment 100, as described elsewhere herein. In some implementations, the machine learning system 201 may receive the set of observations (e.g., as input) from the procedure verification system 116, the POS system 120, or from a storage device.

As shown by the feature set 210, a feature set may be derived from the set of observations. The feature set may include a set of variables. A variable may be referred to as a feature. An observation may include a set of variable values corresponding to the set of variables. A set of variable values may be to an observation. In some cases, different observations may be associated with different sets of variable values, sometimes referred to as feature values.

In some implementations, the machine learning system 201 may determine variables for a set of observations and/or variable values for an observation based on input received from the procedure verification system 116. For example, the machine learning system 201 may identify a feature set (e.g., one or more features and/or corresponding feature values) from structured data input to the machine learning system 201, such as by extracting data from a column of a table, extracting data from a field of a form and/or a message, and/or extracting data received in a structured data format. Additionally, or alternatively, the machine learning system 201 may receive input from one or more systems of the procedure verification system 116 or from an operator to determine features and/or feature values.

In some implementations, the machine learning system 201 may perform natural language processing and/or another feature identification technique to extract features (e.g., variables) and/or feature values (e.g., variable values) from text (e.g., unstructured data) or image input to the machine learning system 201, such as by identifying keywords and/or values associated with those keywords from the text or images.

As an example, a feature set for a set of observations may include a first feature of Does Scanned Item Match Measured Item?, a second feature of Body Pose, a third feature Item Characteristic Value, and so on. As shown, for a first observation, the first feature may have a value of "Yes", the second feature may have a value of "Facing the POS system", the third feature may have a value of "width=12 cm", and so on. As another example, a feature set for a set of observations may include a first feature of Proximity to POS system, a second feature of Facial Features, a third feature of Movement Patterns, and so on. For a first observation, the first feature may have a value of "1 meter", the second feature may have a value of "Looking at POS system", the third feature may have a value of "Steady", and so on. As another example, a feature set for a set of observations may include a first feature of Item Descriptor, a second feature of Movement Patterns, a third feature of Item Weight, and so on. In some such cases, for a first observation, the first feature may have a value of "Bakery item", the second feature may have a value of "Movement in line with measurement procedure", the third feature may have a value of "1.5 lbs.", and so on. These features and feature values are provided as examples and may differ in other examples. For example, the feature set may include one or more of the following features: facial features, body posture, movement patterns, grocery cart contents, age, sex, mobility, quickness, etc.

In some implementations, the machine learning system 201 may pre-process and/or perform dimensionality reduction to reduce the feature set and/or combine features of the feature set to a minimum feature set. A machine learning model 211 may be trained on the minimum feature set, thereby conserving resources of the machine learning system 201 (e.g., processing resources and/or memory resources) used to train the machine learning model 211.

In some cases, the machine learning system 201 can depict an individual's movement or posture from different directions. Coupled with effective score normalization, images from different direction can be integrated to elevate the overall system performance.

The set of observations may be associated with a target variable 215. The target variable 215 may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No, No POS transaction or POS transaction), among other examples. A target variable may be associated with a target variable value, and a target variable value may be associated with an observation. In some cases, different observations may be associated with different target variable values. It will be understood that the target variable may vary across embodiments. For example, in some cases, the target variable 215 is an indication of whether a measurement procedure occurred, whether the measurement procedure was performed correctly, etc.

The target variable may represent a value that a machine learning model 211 is being trained to predict, and the feature set may represent the variables that are input to a trained machine learning model 245 to predict a value for the target variable. The set of observations may include target variable values so that the machine learning model 211 can be trained to recognize patterns in the feature set 210 that lead to a target variable value. A machine learning model that is trained to predict a target variable value may be referred to as a supervised learning model or a predictive model. When the target variable is associated with continuous target variable values (e.g., a range of numbers), the machine learning model 211 may employ a regression technique. When the target variable is associated with categorical target variable values (e.g., classes or labels), the machine learning model 211 may employ a classification technique.

In some implementations, the machine learning model 211 may be trained on a set of observations that do not include a target variable (or that include a target variable, but the machine learning model 211 is not being executed to predict the target variable). This may be referred to as an unsupervised learning model, an automated data analysis model, or an automated signal extraction model. In this case, the machine learning model 211 may learn patterns from the set of observations without labeling or supervision, and may provide output that indicates such patterns, such as by using clustering and/or association to identify related groups of items within the set of observations.

As further shown, the machine learning system 201 may partition the set of observations into a training set 220 that includes a first subset of observations of the set of observations, and a test set 225 that includes a second subset of observations of the set of observations. The training set 220 may be used to train (e.g., fit or tune) the machine learning model 211, while the test set 225 may be used to evaluate a machine learning model 211 that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system 201 may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 25%, among other examples). In some implementations, the machine learning system 201 may randomly select observations to be included in the training set 220 and/or the test set 225.

As shown by reference number 230, the machine learning system 201 may train a machine learning model 211 using the training set 220. This training may include executing, by the machine learning system 201, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model 211 that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system 201 may use one or more hyperparameter sets 240 to tune the machine learning model 211. A hyperparameter may include a structural parameter that controls execution of a machine learning algorithm by the machine learning system 201, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model 211 to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model 211, the machine learning system 201 may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system 201 may tune each machine learning algorithm using one or more hyperparameter sets 240 (e.g., based on operator input that identifies hyperparameter sets 240 to be used and/or based on randomly generating hyperparameter values). The machine learning system 201 may train a machine learning model 211 using a machine learning algorithm and a corresponding hyperparameter set 240. In some implementations, the machine learning system 201 may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system 201 may perform cross-validation when training a machine learning model 211. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system 201 may train a machine learning model 211 on the training groups and then test the machine learning model 211 on the hold-out group to generate a cross-validation score. The machine learning system 201 may repeat this training procedure using different hold-out groups and different test groups to generate a cross-validation score for each training procedure. In some implementations, the machine learning system 201 may independently train the machine learning model 211 k times, with each individual group being used as a hold-out group once and being used as a training group k−1 times. The machine learning system 201 may combine the cross-validation scores for each training procedure to generate an overall cross-validation score for the machine learning model 211. The overall cross-validation score may include, for example, an average cross-validation score (e.g., across all training procedures), a standard deviation across cross-validation scores, or a standard error across cross-validation scores.

In some implementations, the machine learning system 201 may perform cross-validation when training a machine learning model 211 by splitting the training set into a number of groups (e.g., based on operator input that identifies the number of groups and/or based on randomly selecting a number of groups). The machine learning system 201 may perform multiple training procedures and may generate a cross-validation score for each training procedure. The machine learning system 201 may generate an overall cross-validation score for each hyperparameter set 240 associated with a machine learning algorithm. The machine learning system 201 may compare the overall cross-validation scores for different hyperparameter sets 240 associated with the machine learning algorithm and may select the hyperparameter set 240 with the best (e.g., highest accuracy, lowest error, or closest to a desired threshold) overall cross-validation score for training the machine learning model 211. The machine learning system 201 may then train the machine learning model 211 using the selected hyperparameter set 240, without cross-validation (e.g., using all of data in the training set 220 without any hold-out groups), to generate a single machine learning model 211 for a machine learning algorithm. The machine learning system 201 may then test this machine learning model 211 using the test set 225 to generate a performance score, such as a mean squared error (e.g., for regression), a mean absolute error (e.g., for regression), or an area under receiver operating characteristic curve (e.g., for classification). If the machine learning model 211 performs adequately (e.g., with a performance score that satisfies a threshold), then the machine learning system 201 may store that machine learning model 211 as a trained machine learning model 245 to be used to analyze new observations, as described below in connection with FIG. 2.

In some implementations, the machine learning system 201 may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system 201 may generate multiple machine learning models, where each machine learning model 211 has the best overall cross-validation score for a corresponding machine learning algorithm. The machine learning system 201 may then train each machine learning model using the training set 220 (e.g., without cross-validation), and may test each machine learning model using the test set 225 to generate a corresponding performance score for each machine learning model. The machine learning model 211 may compare the performance scores for each machine learning model and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model 211 may be trained using a different process than what is described in connection with FIG. 2. Additionally, or alternatively, the machine learning model 211 may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
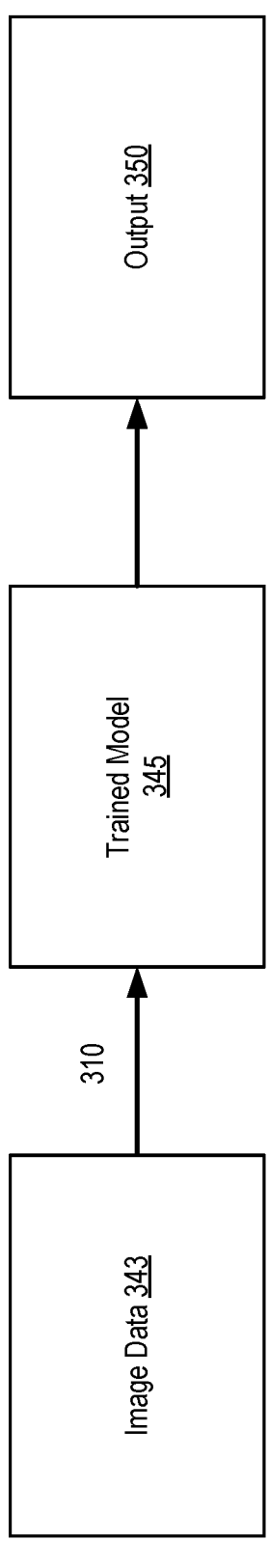
FIG. 3 is a diagram illustrating an example of applying a trained machine learning model to a new observation associated with characterizing likelihood of an individual participating in a POS transaction.

FIG. 3 is a diagram illustrating an example 300 of applying a trained machine learning model to a new observation associated with determining whether a measurement procedure was performed properly. The new observation may be input to a machine learning system 201 that stores a trained machine learning model 345. In some implementations, the trained machine learning model 345 may be the trained machine learning model 245 described above in connection with FIG. 2. The machine learning system 201 may include or may be included in a computing device, a server, or a cloud computing environment, such as the procedure verification system 116 of FIG. 1.

As shown by reference number 310, the machine learning system 201 may receive a new observation or a set of new observations (e.g., image data 343) and may input the new observation to the machine learning model 345. As described with respect to FIG. 2, the new observation may include, for example, a first feature of Proximity to POS system, a second feature of Body Pose, a third feature of Number of Items in Cart, and so on.

The machine learning system 201 may apply the trained machine learning model 345 to the new observation to generate an output 350, such as a result indicating an identifier of a POS system expected to be interacted with. The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model 345 and/or observations used to train the machine learning model), such as when unsupervised learning is employed. In some implementations, the output 350 includes an indication of an identity of the POS system. For example, the output can correspond to a "best guess" for whether the individual will perform a POS transaction at a POS system, based on the input features. Furthermore, as described herein, in some cases, the output 350 includes a confidence value for the output.

In some implementations, the trained machine learning model 345 may predict a value of "performed correctly" with a high confidence level, and based on this prediction, the machine learning system 201 may provide a recommendation to update the item catalog with the new measurements, or may automatically update the item catalog with the new measurements. On the other hand, if the machine learning model predicts that the measurement procedure was not performed correctly, with a low confidence level, the machine learning system 201 may discard the measurement data, flag the image or video for further investigation, or may prompt the individual to perform the measurement procedure again.

In some implementations, the trained machine learning model 345 may predict a value of "equipment malfunction" with a high confidence level, and based on this prediction, the machine learning system 201 may provide a recommendation to perform maintenance on the equipment or may automatically schedule maintenance for the equipment. On the other hand, if the machine learning model predicts that the equipment is functioning correctly, with a high confidence level, the machine learning system 201 may continue to use the equipment for measurement procedures without interruption.

In some implementations, the trained machine learning model 345 may predict a value of "fraudulent activity" with a high confidence level, and based on this prediction, the machine learning system 201 may provide a recommendation to investigate the transaction or may automatically flag the transaction for further review. On the other hand, if the machine learning model predicts that the transaction is legitimate, with a high confidence level, the machine learning system 201 may allow the transaction to proceed as normal.

The concepts of the present disclosure significantly improves the robustness of inventory control measures by utilizing a trained neural network to analyze images or videos of measurement procedures, and determine whether measurement procedures were performed correctly or not. This helps to ensure that the item catalog remains up-to-date and accurate, which can help to improve the efficiency and effectiveness of inventory control measures and reduce mistakes or fraudulent activity during POS transactions. The machine learning system 201 can enable recognition and/or identification of tens, hundreds, thousands, or millions of features and/or feature values for tens, hundreds, thousands, or millions of observations, thereby increasing accuracy and consistency and reducing delay associated with the relative resources (e.g., computing or human) required to be allocated for tens, hundreds, or thousands of operators to manually identify an individual's actions. As indicated above, FIG. 3 is provided as an example. Other examples may differ from what is described in connection with FIG. 3.

Figure 4:
FIG. 4 is a flow diagram illustrative of an embodiment of a process for determine whether a measurement procedure was performed properly.
Figure 4:
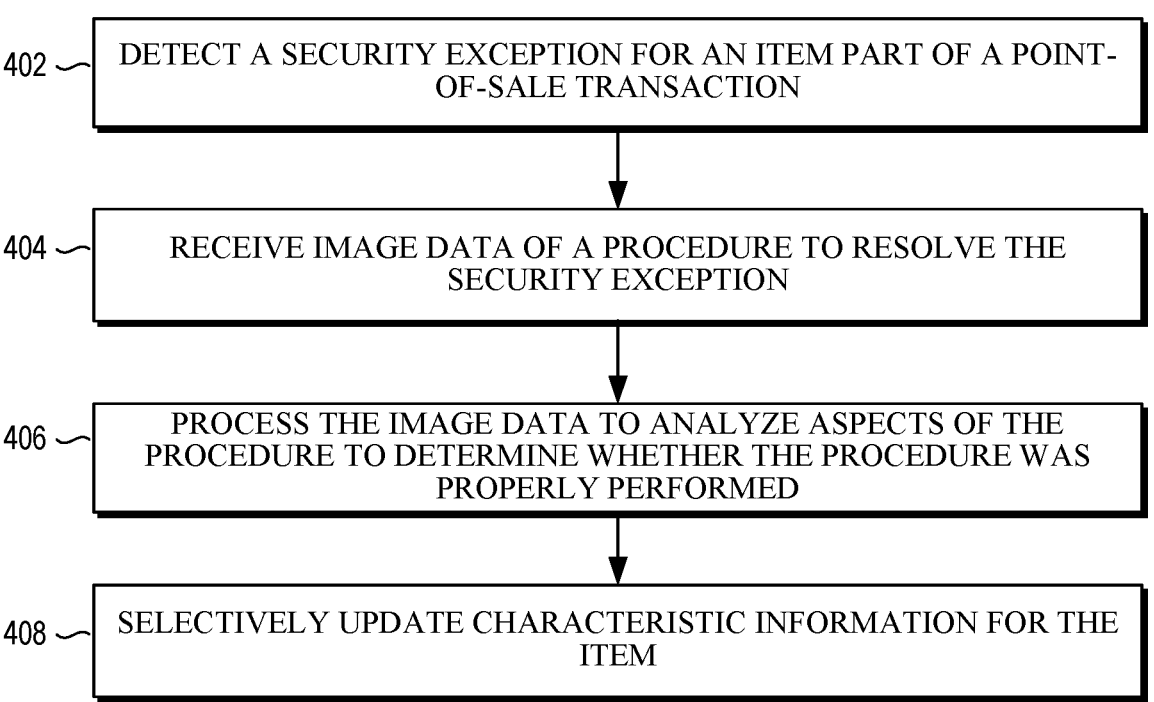

FIG. 4 is a flow diagram illustrative of an embodiment of a process 400 for determine whether a measurement procedure was performed properly. Although described as being implemented by the inventory control system 110, it will be understood that the elements outlined for process 400 can be implemented by one or more computing devices or components that are associated with the environment 100, such as, but not limited to, the inventory integrity system 112, the imaging device 114, the procedure verification system 116, the catalog management system 118, the POS system 120, etc. Thus, the following illustrative embodiment should not be construed as limiting.

At block 402, the inventory control system 110 detects a security exception for an item that is part of a POS transaction. This detection is made by comparing the item's actual characteristic information to the expected characteristic information stored in the item catalog 132. The item catalog 132 is a database that stores various information about the items in the inventory, such as weight, dimensions, manufacturer's specifications, and previous measurements. This expected characteristic information can be obtained from various sources such as the manufacturer's specifications, previous measurements or previous transactions. However, in some cases, the stored characteristic information is incorrect or inaccurate. For example, when the item is new to inventory or has new packaging, the item catalog 132 may not be up to date. In some cases, the inventory control system 110 detects a security exception for an item based on a determination that some stored characteristic information is missing or is null, indicating that the item may not have been properly scanned or entered into the system. For example, if a box of crackers has a stored dimension of 0 cms in the item catalog 132, then the inventory control system 110 would detect a security exception, as it is highly unlikely, if not impossible, for a box of crackers to have a dimension of 0 cms. In addition or alternatively, in some cases, the inventory control system 110 detects a security exception by comparing actual characteristic information obtained during the POS transaction to the expected (stored) characteristic information. For example, if the item is a bag of chips and the expected weight is 12 oz, but the actual weight is only 10 oz, the inventory control system 110 would detect a security exception. In some cases, if the stored characteristic information match the measured characteristic information, then no security exception is issued.

As described herein, the security exception can be resolved by performing a measurement procedure, which can include various steps. As a non-limiting example, a measurement procedure can include the shopper assistant scanning their shopper assistant card at the POS system, accessing a shopper assistant menu, indicating an attempt to resolve the security exception, and then placing the item in a designated location (e.g., on the belt or in the bagging area) for the POS system to measure one or more item characteristics, such as weight or dimensions. In some cases, the shopper assistant may also be required to perform the measurement procedure in a designated location, such as an area of the store where the measurement equipment is located.

At block 404, the inventory control system 110 receives image data of a procedure performed by an individual, such as an individual, to resolve the security exception. The image data can be captured using cameras or other imaging devices located in the store and can include various types of visual information such as images of the individual interacting with the item, images of the item being placed in a designated location, or videos of the individual performing the measurement procedure. The image data can include, for example, images of the individual interacting with the item, such as the individual scanning their ID card, accessing the shopper assistant menu, selecting the item with the security exception, and placing it in the designated location on the belt or in the bagging area for the POS system to measure one or more item characteristics, such as weight or dimensions. Additionally, the image data can also capture aspects of the individual's appearance or behavior such as facial features, body posture, movement patterns and hand gestures. This image data can be used to provide visual evidence of the measurement procedure performed and can be analyzed to determine whether it was performed properly. The analysis can also include factors such as the proper positioning of the item in relation to the individual's body, and the surrounding environment, to confirm that the item was moved correctly from the scanning or bagging area to the designated area for the measurement procedure to be performed.

At block 406, the inventory control system 110 processes the image data to analyze aspects of a behavioral characteristic (e.g., actions, movements, an appearance, a behavior, facial features, body posture, or movement patterns of the individual) of the individual captured in the image data, such as their posture, facial expression, and hand gestures, to determine whether the measurement procedure was performed properly. In some cases, the inventory control system 110 determines that the measurement procedure was performed properly. In some cases, the inventory control system 110 determines that the measurement procedure was not performed properly. This processing can be performed using a trained neural network that can monitor the individual's actions to ensure they are in line with the correct measurement procedure, such as following the correct steps to obtain accurate measurement data. The neural network can also track the item since it was scanned to ensure it is the same item that is being measured. For example, if the individual is seen picking up the item and moving it to a designated location, the inventory control system 110 can determine that the measurement procedure was properly performed. On the other hand, if the individual is seen not following the proper steps, such as not placing the item in the designated location or putting the wrong (e.g., a different) item in the designated location, the inventory control system 110 determine that the measurement procedure was improperly performed.

As a non-limiting example, the neural network may be trained using a dataset of images of individuals correctly performing the measurement procedure, such as properly placing the item on the measurement equipment and ensuring that the item is level and stable before taking the measurement. The neural network can then analyze image data of an individual performing the measurement procedure and compare it to this dataset to determine whether the individual is performing the measurement procedure correctly. If the neural network determines that the individual is following the proper protocol and performing the measurement procedure correctly, it can output a high confidence level indicating that the measurement procedure was performed correctly. On the other hand, if the neural network detects that the individual is not following proper protocol, such as not properly positioning the item on the measurement equipment, it can output a low confidence level indicating that the measurement procedure was not performed correctly.

At block 408, the inventory control system 110 selectively updates the characteristic information for the item based on the determination of whether the measurement procedure was properly or improperly performed. For example, in some cases, if the inventory control system 110 determines that the measurement procedure was improperly performed, it can discard or ignore any characteristic information measured as part of the measurement procedure. Alternatively, if the inventory control system 110 determines that the measurement procedure was properly performed, it can update the item catalog 132 with the new characteristic information. In some cases, rather than update the item catalog 132, the inventory control system 110 can store the newly measured characteristic information for future analysis. This allows the inventory control system 110 (or another system) to determine if the new characteristic information is consistent with the information from other measurement procedures performed on the same item before updating the item catalog 132. This helps ensure that the item catalog 132 is accurate and up to date.

It will be understood that the various blocks described with respect to FIG. 4 can be implemented in a variety of orders and/or can be implemented concurrently or in an altered order, as desired. For example, in some cases, the process 400 can be concurrently performed for multiple individuals or POS systems, such as tens, hundreds, or thousands of individuals or POS systems. Furthermore, it will be understood that fewer, more, or different blocks can be used as part of the process 400 of FIG. 4.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the routines described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, rather than sequentially.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

As used herein, the term "component" is intended to be broadly construed as hardware, firmware, or a combination of hardware and software.

These and other changes can be made to the present disclosure in light of the above Detailed Description. While the above description describes certain examples of the present disclosure, and describes the best mode contemplated, no matter how detailed the above appears in text, the present disclosure can be practiced in many ways. Details of the system may vary considerably in its implementation, while still being encompassed by the present disclosure disclosed herein. As noted above, particular terminology used when describing certain features or aspects of the present disclosure should not be taken to imply that the terminology is being redefined herein to be restricted to any characteristics, features, or aspects of the present disclosure with which that terminology is associated. In general, the terms used in the following claims should not be construed to limit the present disclosure to the examples disclosed in the specification, unless the above Detailed Description section explicitly defines such terms. Accordingly, the actual scope of the present disclosure encompasses not only the disclosed examples, but also all equivalent ways of practicing or implementing the present disclosure under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. A method for improving inventory accuracy during a point-of-sale (POS) transaction, comprising:

detecting a security exception for an item during a POS transaction, the security exception indicating a discrepancy between a weight or dimension of the item, as measured by a measurement apparatus, and first characteristic information stored in an item catalog;

initiating a measurement procedure to resolve the security exception, the measurement procedure including a requirement for an individual to place the item on the measurement apparatus comprising at least one of a scale or a dimension analyzer;

causing, as part of the measurement procedure, the measurement apparatus to obtain measured characteristic information for the item and causing one or more imaging devices positioned to monitor the measurement apparatus to capture image data representing performance of the measurement procedure by the individual, the image data including physical interaction by the individual with the item and the measurement apparatus;

receiving the image data captured by the one or more imaging devices monitoring the measurement apparatus;

processing the image data using a machine-learned model trained on labeled image data representing correct and incorrect measurement procedures, to extract one or more behavioral features indicative of compliance with an expected measurement protocol, the one or more behavioral features comprising at least one of a body orientation facing the measurement apparatus, a gesture placing the item onto the measurement apparatus, or a physical proximity of the individual to the measurement apparatus during the measurement procedure;

generating, based on the one or more behavioral features, a confidence score representing a likelihood that the measurement procedure was performed correctly;

determining, based on the confidence score, a procedural validity status for the measurement procedure, wherein the procedural validity status is valid when the confidence score satisfies a predefined threshold; and updating the first characteristic information in the item catalog using the measured characteristic information obtained by the measurement apparatus during the measurement procedure, responsive to the procedural validity status being valid.

2. The method of claim 1, wherein updating comprises communicating the measured characteristic information to a shared storage system, wherein the shared storage system aggregates potential updates to the characteristic information received from a plurality of POS systems, analyzes the potential updates to the characteristic information, and updates the first characteristic information in the item catalog based on the analysis.

3. The method of claim 1, wherein based on a determination that the measurement procedure was not performed properly, the updating comprises discarding or ignoring any characteristic information measured as part of the measurement procedure.

4. The method of claim 1, wherein the method further comprises:

detecting a scan of the item as part of the POS transaction;

obtaining the first characteristic information associated with the item; and determining that the first characteristic information is incomplete or inaccurate, wherein the detecting the security exception is based on the determining that the first characteristic information is incomplete or inaccurate.

5. The method of claim 1, wherein the measurement procedure is performed correctly when the individual places the item that was scanned in a designated location in a bagging area so that the measurement apparatus can obtain measures of one or more characteristics.

6. The method of claim 1, wherein the processing the image data comprises using a trained neural network.

7. The method of claim 6, wherein the trained neural network determines whether the item that was scanned is the same item that was used in the measurement procedure.

8. The method of claim 1, wherein complete and accurate characteristic information is usable to reduce fraudulent activity during POS transactions, wherein a POS system verifies that items scanned at the POS system match items placed in a bagging area by comparing actual measures of characteristics of the items placed in the bagging area to expected values of characteristics of the items scanned at the POS system.

9. The method of claim 1, further comprising:

receiving an indication of a scan of the item as part of the POS transaction;

determining that stored characteristics information for the item are unsatisfactory; and enabling initiation of the measurement procedure based on the determining.

10. The method of claim 9, wherein the determining that the stored characteristics information for the item are unsatisfactory includes determining that the stored characteristics information indicates that dimensions for the item are zero or null.

11. The method of claim 1, wherein the first characteristic information is incomplete and/or inaccurate characteristic information.

12. The method of claim 1, wherein the behavioral features includes at least one of an appearance or a behavior of the individual as captured in the image data.

13. A system, comprising:

one or more processors communicatively to a point-of-sale (POS) system, the one or more processors configured to:

detect a security exception for an item during a POS transaction, the security exception indicating a discrepancy between a weight or dimension of the item, as measured by a measurement apparatus, and first characteristic information stored in an item catalog;

initiate a measurement procedure to resolve the security exception, the measurement procedure including a requirement for an individual to place the item on the measurement apparatus comprising at least one of a scale or a dimension analyzer;

cause, as part of the measurement procedure, the measurement apparatus to obtain measured characteristic information for the item and causing one or more imaging devices positioned to monitor the measurement apparatus to capture image data representing performance of the measurement procedure by the individual, the image data including physical interaction by the individual with the item and the measurement apparatus;

receive image data captured by one or more imaging devices monitoring the measurement apparatus;

process the image data using a machine-learned model trained on labeled image data representing correct and incorrect measurement procedures, to extract one or more behavioral features indicative of compliance with an expected measurement protocol, the one or more behavioral features comprising at least one of a body orientation facing the measurement apparatus, a gesture placing the item onto the measurement apparatus, or a physical proximity of the individual to the measurement apparatus during the measurement procedure;

generate, based on the one or more behavioral features, a confidence score representing a likelihood that the measurement procedure was performed correctly;

determine, based on the confidence score, a procedural validity status for the measurement procedure, wherein the procedural validity status is valid when the confidence score satisfies a predefined threshold; and update the first characteristic information in the item catalog using the measured characteristic information obtained by the measurement apparatus during the measurement procedure, responsive to the procedural validity status being valid.

14. The system of claim 13, wherein based on a determination that the measurement procedure was performed correctly, the one or more processors are configured to update the first characteristic information to include the measured characteristic information.

15. The system of claim 13, wherein based on a determination that the measurement procedure was performed correctly, the one or more processors communicate the measured characteristic information to a shared storage system, wherein the shared storage system aggregates potential updates to the characteristic information received from a plurality of POS systems, analyzes the potential updates to the characteristic information, and updates the first characteristic information in the item catalog based on the analysis.

16. The system of claim 13, wherein the one or more processors are configured to:

detect a scan of the item as part of the POS transaction;

obtain the first characteristic information associated with the item; and determine that the first characteristic information is incomplete or inaccurate, wherein the detection of the security exception is based on the determination that the first characteristic information is incomplete or inaccurate.

17. Non-transitory computer-readable media storing computer executable instructions that when executed by one or more processors cause the one or more processors to:

detect a security exception for an item during a POS transaction, the security exception indicating a discrepancy between a weight or dimension of the item, as measured by a measurement apparatus, and first characteristic information stored in an item catalog;

initiate a measurement procedure to resolve the security exception, the measurement procedure including a requirement for an individual to place the item on the measurement apparatus comprising at least one of a scale or a dimension analyzer;

cause, as part of the measurement procedure, the measurement apparatus to obtain measured characteristic information for the item and causing one or more imaging devices positioned to monitor the measurement apparatus to capture image data representing performance of the measurement procedure by the individual, the image data including physical interaction by the individual with the item and the measurement apparatus;

receive the image data captured by the one or more imaging devices monitoring the measurement apparatus;

process the image data using a machine-learned model trained on labeled image data representing correct and incorrect measurement procedures, to extract one or more behavioral features indicative of compliance with an expected measurement protocol, the one or more behavioral features comprising at least one of a body orientation facing the measurement apparatus, a gesture placing the item onto the measurement apparatus, or a physical proximity of the individual to the measurement apparatus during the measurement procedure;

generate, based on the one or more behavioral features, a confidence score representing a likelihood that the measurement procedure was performed correctly;

determine, based on the confidence score, a procedural validity status for the measurement procedure, wherein the procedural validity status is valid when the confidence score satisfies a predefined threshold; and update the first characteristic information in the item catalog using the measured characteristic information obtained by the measurement apparatus during the measurement procedure, responsive to the procedural validity status being valid.

\* \* \* \* \*